United States Patent
Aaltonen et al.

(10) Patent No.: US 7,711,315 B2
(45) Date of Patent: May 4, 2010

(54) METHOD AND MOBILE TERMINAL FOR ACCESSING A SERVICE PORTAL VIA BI-DIRECTIONAL NETWORK

(75) Inventors: Erkki I. Aaltonen, Turku (FI); Larri Vermola, Turku (FI); Tero Naumi, Koski T1 (FI); Timo Lahnalampi, Salo (FI); Jouko Paavilainen, Turku (FI); Kai-Uwe Prokki, Espoo (FI)

(73) Assignee: Nokia Corporation, Espoo (FI)

( * ) Notice: Subject to any disclaimer, the term of this patent is extended or adjusted under 35 U.S.C. 154(b) by 673 days.

(21) Appl. No.: 10/574,193
(22) PCT Filed: Oct. 26, 2004
(86) PCT No.: PCT/IB2004/052204
§ 371 (c)(1), (2), (4) Date: Mar. 28, 2006
(87) PCT Pub. No.: WO2005/041594
PCT Pub. Date: May 6, 2005

(65) Prior Publication Data
US 2006/0294205 A1 Dec. 28, 2006

(30) Foreign Application Priority Data
Oct. 27, 2003 (GB) .................... 0325039.6

(51) Int. Cl.
H04H 20/74 (2008.01)
(52) U.S. Cl. .............. 455/3.02; 455/3.01; 455/3.04; 455/515; 455/550.1; 455/552.1; 370/310; 370/312; 370/328; 725/39; 725/56; 725/62; 725/112; 725/123
(58) Field of Classification Search .............. 455/414.1, 455/414.2, 414.3, 414.4, 3.01, 3.02, 3.03, 455/3.04, 3.06, 518, 519, 434, 515, 520, 455/550.1, 553.1; 709/223; 725/4, 37, 41, 725/39, 48, 56, 62, 63, 117, 118, 123, 133, 725/38, 54, 55, 57, 58, 112; 370/312, 432, 370/310, 328; 386/68
See application file for complete search history.

(56) References Cited

U.S. PATENT DOCUMENTS
6,968,364 B1 * 11/2005 Wong et al. ................ 709/217
(Continued)

FOREIGN PATENT DOCUMENTS
EP 1 359 774 A1 11/2003
(Continued)

OTHER PUBLICATIONS
Chinese Office Action for corresponding CN Application No. 200480031704.X, Oct. 23, 2009, China.

Primary Examiner—Charles N Appiah
Assistant Examiner—Olumide T Ajibade Akonai
(74) Attorney, Agent, or Firm—Ditthavong Mori & Steiner, P.C.

(57) ABSTRACT

A user of a combined mobile telephone and IPDC receiver (10) accesses a WAP portal (16) through the Internet (82) and/or a mobile telephone network (81). The WAP portal (16) provides a service menu, comprising a number of links to service menus further down in the hierarchy or to IPDC services. The WAP portal (16) is provided with information relating to IPDC services by an IPDC operator (80). This information includes at least the name of the service, the IP address and the port number relating to each service. The information may additionally include a Network Information Table, IP/MAC Notification Table and Program Mapping Table, although this information may be provided to the mobile terminal instead by broadcast from a DVB transmitter (13). When a user of the mobile terminal (10) selects an item on the service menu presented by the WAP portal (16) which relate to IPDC service, the WAP portal pushes information relating to that service to the mobile terminal (10), allowing the mobile terminal to open an appropriate IP channel and consequently receive and consume the IPDC service.

40 Claims, 5 Drawing Sheets

U.S. PATENT DOCUMENTS

| | | | |
|---|---|---|---|
| 2002/0025777 A1* | 2/2002 | Kawamata et al. | 455/3.05 |
| 2002/0137496 A1* | 9/2002 | Nagaoka et al. | 455/414 |
| 2002/0142757 A1 | 10/2002 | Leung et al. | 455/412 |
| 2002/0151271 A1* | 10/2002 | Tatsuji et al. | 455/3.05 |
| 2002/0183059 A1* | 12/2002 | Noreen et al. | 455/427 |
| 2003/0032389 A1* | 2/2003 | Kim et al. | 455/3.01 |
| 2003/0104832 A1* | 6/2003 | Ferris | 455/550 |
| 2003/0174678 A1 | 9/2003 | Chang et al. | 370/335 |
| 2004/0052504 A1* | 3/2004 | Yamada et al. | 386/68 |
| 2004/0117857 A1* | 6/2004 | Bisdikian et al. | 725/141 |
| 2004/0203630 A1* | 10/2004 | Wang | 455/414.1 |
| 2005/0090235 A1* | 4/2005 | Vermola et al. | 455/414.3 |
| 2006/0092966 A1* | 5/2006 | Sitnik et al. | 370/463 |
| 2007/0072542 A1* | 3/2007 | Haagen | 455/3.06 |

FOREIGN PATENT DOCUMENTS

| | | |
|---|---|---|
| EP | 1 420 551 A2 | 11/2003 |
| WO | WO 9933076 A1 * | 7/1999 |
| WO | WO 02/13488 A1 | 2/2002 |
| WO | WO-02/057959 A2 | 7/2002 |

* cited by examiner

METHOD AND MOBILE TERMINAL FOR ACCESSING A SERVICE PORTAL VIA BI-DIRECTIONAL NETWORK

FIELD OF THE INVENTION

The invention relates to a method of operating a mobile terminal comprising accessing a service portal via a bi-directional network. The invention relates also to a mobile terminal comprising means for accessing a service portal via a bi-directional network. Another aspect of the invention relates to a method of operating a service portal, and yet another aspect relates to a service portal. A further aspect of the invention relates to a system comprising a service portal accessible via a bi-directional network by a mobile terminal. A still further aspect of the invention relates to a method of operating a system comprising a service portal and a mobile terminal.

BACKGROUND OF THE INVENTION

Much has been said recently about the provision in mobile terminals, for example mobile telephones, of the capability of receiving Internet protocol data casting (IPDC) services, also known as IP time-sliced services. Convention is to provide an electronic service guide (ESG) in the mobile terminal, which is updated with ESG data transmitted over an IPDC network. The completed ESG present on a mobile terminal allows broadcast services to be accessed and consumed in the mobile terminal. However, this does not allow much flexibility as to the form that the ESG may take, nor to how services are presented in a selectable manner to users of a mobile terminal.

SUMMARY OF THE INVENTION

A first aspect of the invention provides a method of operating a mobile terminal, the method comprising: accessing a service portal via a bi-directional network; selecting an item on a service menu included in the service portal and corresponding to a broadcast service; receiving channel parameter data relating to the corresponding broadcast service from the service portal; using the received channel parameter data to open a communications channel; and receiving broadcast data for the broadcast service through the communications channel.

The service portal is in an embodiment a wireless application protocol (WAP), although it may instead take another suitable form. The channel parameter data preferably includes an Internet protocol (IP) address and/or port number relating to the broadcast service, allowing the mobile terminal to receive and consume the required service relatively easily. The ease of reception and consumption can be improved by providing one or more of additional data such as, in case of DVB broadcast, INT, NIT and PMT data, which may be provided by the service portal or received over the broadcast network.

According to a second aspect of the invention, there is provided a mobile terminal comprising: means for accessing a service portal via a bi-directional network; means for allowing selection of an item on a service menu included in the portal and corresponding to a broadcast service; means for receiving from the portal channel parameter data relating to the broadcast service; means for opening a communications channel using the channel parameter data; and means for receiving broadcast data for the broadcast service through the communications channel.

According to a third aspect of the invention, there is provided a method of operating a service portal, the method comprising: storing data relating to channel parameters of one or more broadcast services; providing one or more selectable items on a service menu, each item relating to a broadcast service; and in response to the selection of an item from a remote terminal, sending channel parameter data relating to the corresponding broadcast service to the remote terminal.

Preferably, the method further comprises recording the number of occasions of each item being selected. This may or may not be carried out anonymously, i.e. identifying or not the mobile terminal or a subscriber using the mobile terminal along with the data. Either way, this can allow an operator of a mobile telephone network or other provider of the service portal to obtain data indicative of the relative usage of the broadcast services accessed through the service portal.

According to a fourth aspect of the invention, there is provided a service portal arranged: to store data relating to channel parameters of one or more broadcast services; to provide one or more selectable items on a service menu, each item relating to a broadcast service; and to be responsive to the selection of an item by a remote terminal to send channel parameter data relating to the corresponding broadcast service to the remote terminal.

According to a fifth aspect of the invention, there is provided A system comprising a service portal accessible via a bi-directional network by a mobile terminal, the service portal being arranged to provide a service menu comprising one or more items each corresponding to a broadcast service; the mobile terminal being arranged for allowing selection of one of the items; the service portal being responsive to an item selection to send to the mobile terminal channel parameter information relating to the corresponding broadcast service; the mobile terminal being arranged to use the channel parameter information to open a communications channel, and to receive broadcast data for the broadcast service through the communications channel.

According to a sixth aspect of the invention, there is provided a method of operating a system comprising a service portal and a mobile terminal, the method comprising: accessing the service portal from the mobile terminal via a bi-directional network; providing a service menu comprising one or more items each corresponding to a broadcast service; using the mobile terminal to select one of the items; sending from the service portal to the mobile terminal channel parameter information relating to the broadcast service; at the mobile terminal, using the received channel parameter information to open a communications channel; and at the mobile terminal, receiving broadcast data for the broadcast service through the communications channel.

BRIEF DESCRIPTION OF THE DRAWINGS

Embodiments of the present invention will now be described, by way of example only, with reference to the accompanying drawings, in which.

DETAILED DESCRIPTION OF EMBODIMENTS OF THE INVENTION

Figure 1:
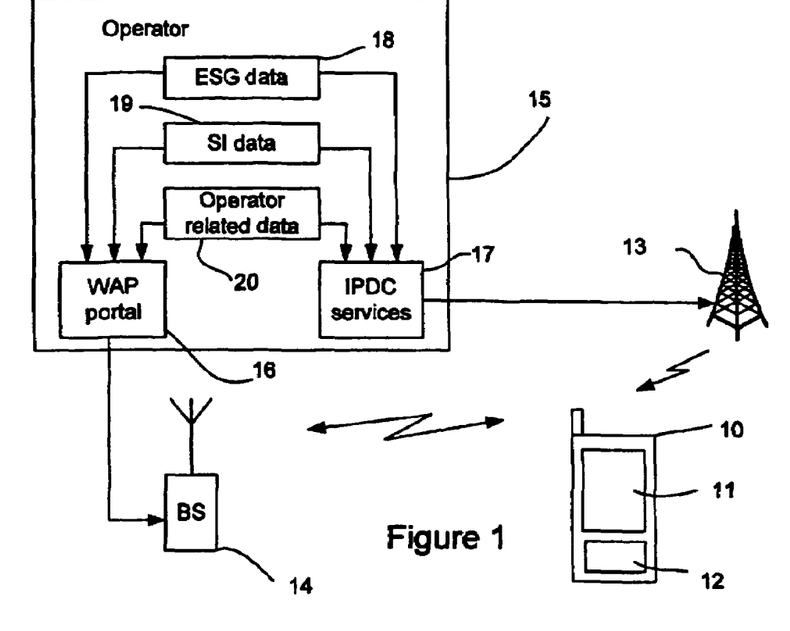
FIG. 1 is a schematic drawing illustrating one embodiment of a mobile terminal operating in an environment with a DVB system and a mobile telephone system.

In the drawings, like reference numerals denote like elements. Referring firstly to FIG. 1, a mobile terminal 10 is illustrated schematically comprising a display 11 and a keyboard 12. The mobile terminal 10 includes the functionality of a mobile telephone and the functionality of an Internet Protocol datacasting (IPDC) receiver. Much has been written about such mobile terminals in recent times, so it is not necessary to provide a detailed description here. The mobile telephone capabilities of the mobile terminal 10 can take any form. In this embodiment, the mobile terminal 10 is operable to communicate in a GSM or 3G network, although it may instead be operable in a network according to a US, Japanese or Korean standard or a standard applicable in any other part of the world. The mobile telephone operability may utilise orbiting satellites instead of ground based transceiver stations. The IPDC receiver means comprises at least one of a terrestrial digital video broadcasting (DVB-T) and/or a handheld digital video broadcasting (DVB-H) receiver. Alternatively, it may be a receiver operating to the ATSC standard, or to any other digital audio or digital video broadcasting standard.

In this example, the mobile terminal 10 is operable to receive digital video broadcasting transmissions from a transmitter 13 and to communicate with a mobile telephone network by virtue of a bi-directional link with a base station 14. The DVB transmitter 13 and the base station 14 both are connected to an operator station 15. In this example, the operator station 15 is that of a combined mobile telephone network operator and IPDC service operator. The hardware and software components forming part of the operator station 15 are not critical to the invention, so are not described here.

Shown in the operator system 15 are a WAP portal 16 and an IPDC services module 17. Both the WAP portal 16 and the IPDC services 17 are connected to receive data from an electronic service guide (ESG) data provision module 18, a service information (SI) data provision module 19 and an operator related data provision module 20. The WAP portal 16 is in two-way communication with the base station 14, so that data may be passed in both directions therebetween. The IPDC services module 17 is operable to provide data unidirectionally to the DVB transmitter 13, for forwarding onto the mobile terminal 10 and any other terminal existing within range of the transmitter.

The WAP portal 16 in this example comprises a service provision portal like that of T-zones™ or Vodafone live!™. The WAP portal 16 is operable to provide one or more service menus, preferably in a hierarchal fashion. Each service menu comprises a number of links to either a further service menu lower down in the hierarchy or to a resource providing an end service.

The IPDC services module 17 provides a full digital broadcast service, comprising a number of services transmitted in a time-sliced fashion. In addition to content, the IPDC services module 17 arranges for the appropriate transmission of ESG data, SI data and other operator or services related data, which is provided by the ESG data module 18, the SI data module 19 and the operator related data module 20 respectively. It is preferred that ESG data and SI data is included with sufficient frequency and in such a manner that a mobile terminal, such as the mobile terminal 10, can perform ESG discovery in a relatively short time and with relatively high efficiency.

In a first embodiment, the WAP portal 16 is arranged to include data provided by the ESG data module 18, the SI data module 19 and the operator related data module 20. In particular, the WAP portal 16 is provided with, in respect of each IPDC service which the WAP portal 16 is to offer, the name of the service, the Internet Protocol (IP) address of the service and the port number of the service. Furthermore, the data includes the network information table (NIT), the IP/MAC notification table (INT), and the program mapping table (PMT) data. The NIT, INT and PMT data may be provided additionally as part of the ESG data. The remainder of the ESG data can be ignored by the WAP portal if inappropriate, or alternatively used by the WAP portal or forwarded onto the mobile terminal 10.

In a second embodiment, the WAP portal 16 is not provided with all of the data with which the WAP portal of the first embodiment is provided. Instead, the WAP portal 16 is provided only with data indicative of the name of the service, the IP address of the service and the port number. In this case, the INT, the NIT and the PMT SI data is provided to the mobile terminal 10 through the DVB network by way of the transmitter 13. This is described in more detail below.

Figure 2:
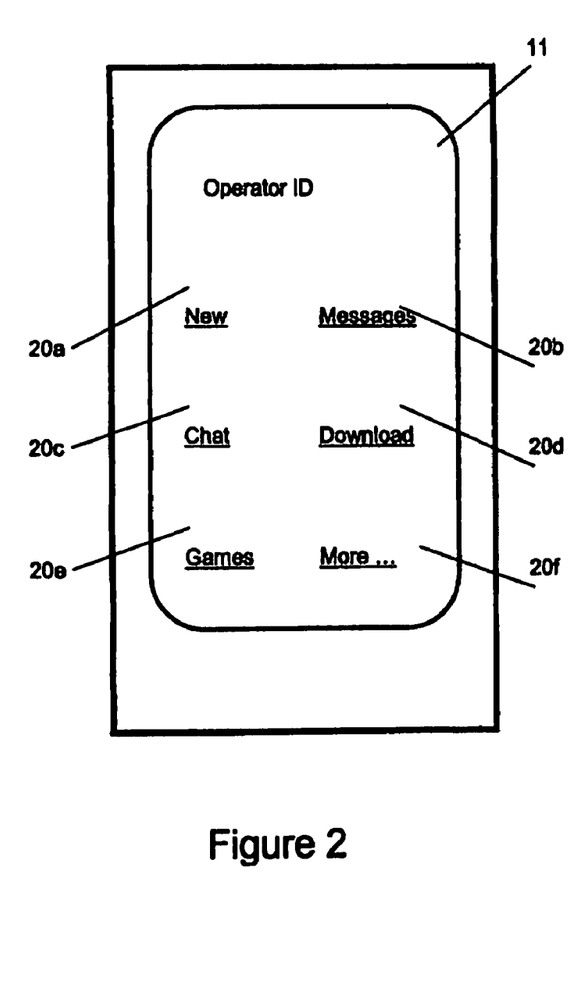
FIGS. 2 to 5 are schematic drawings illustrating exemplary screen shots of the mobile terminal of FIG. 1 at varied stages in a service selection procedure.
Figure 3:
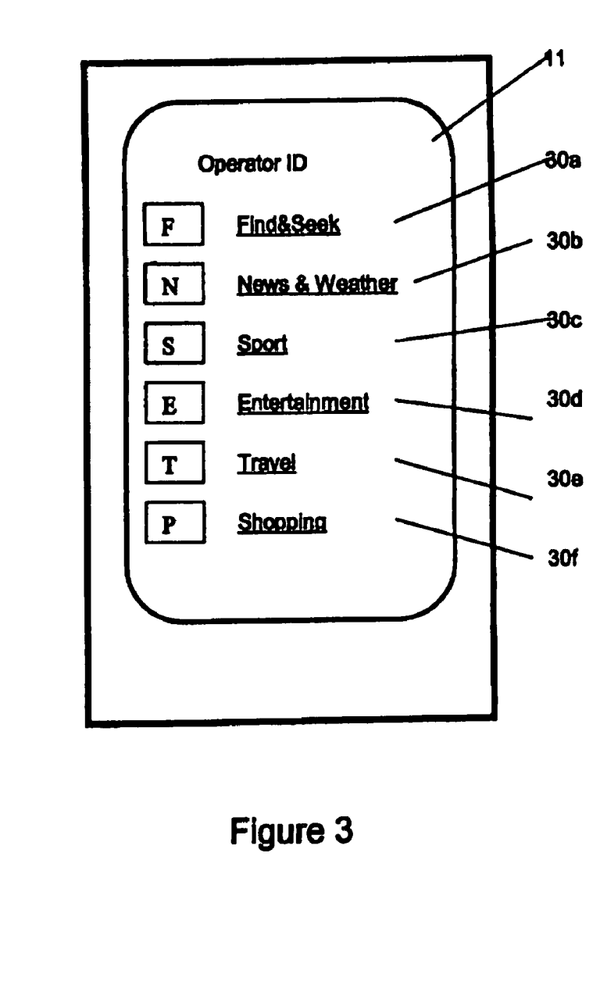

Operation of the first embodiment is now continued with reference to FIGS. 2 to 6. In FIG. 2, a service menu, or page, of a WAP portal of the mobile telephone operator is illustrated. The first service menu is known as the 'main page'. Here, on the display 11 are illustrated first to sixth icons 20a to 20f, which are "new", "messages", "chat", "download", "games", and "more . . . " respectively. Also shown at the top of the display 11 is the name of the WAP portal, in this case Vodafone live!™, and shown at the bottom of the display 11 are functions of first and second soft keys (not shown), which in this example are "select" and "back". Following selection by a user of the sixth icon 20f "more . . . " through the keypad 12, the display 11 is altered to that shown in FIG. 3. Here, the name of the service menu is provided at the top of the display 11, and the functions of soft keys are shown at the bottom of the display 11. Also, first to sixth items 30a to 30f are illustrated. The third item 30c is "sport", which when selected by user using the keypad 12 or other selecting means (not shown) provided in the terminal causes the mobile terminal 10 to show the display illustrated in FIG. 4.

Figure 4:
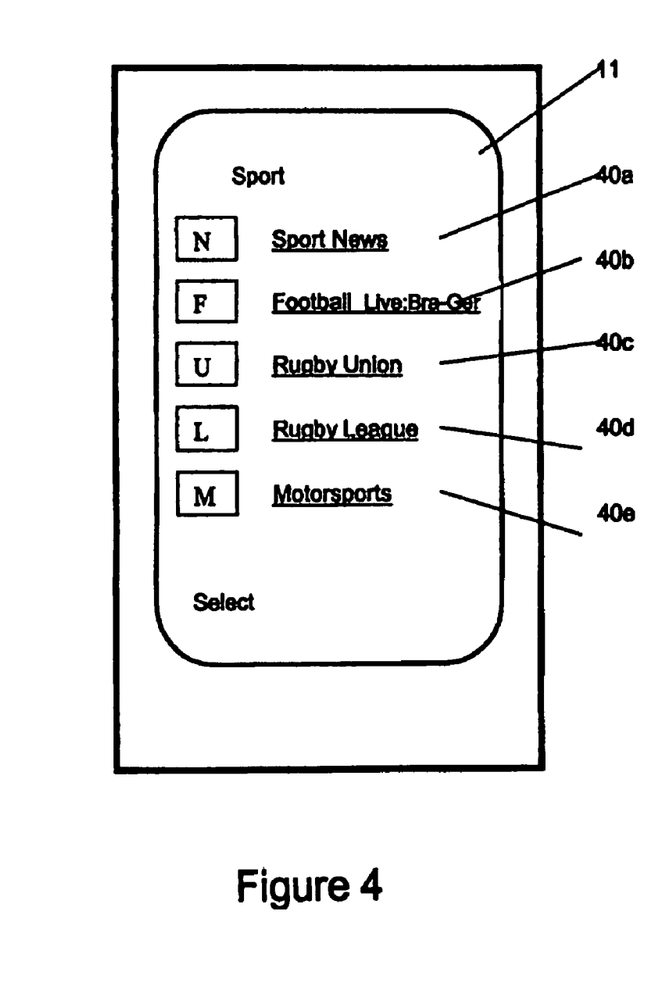
Figure 5:
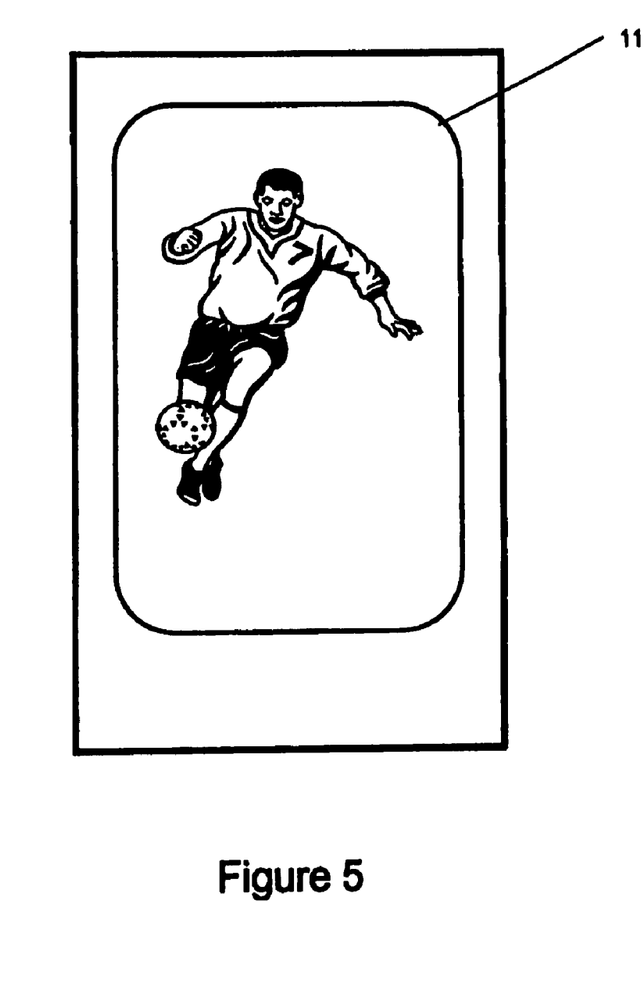

In FIG. 4, the uppermost section of the display 11 shows the name of the service menu, which in this case is "sport". A number of services available in this service menu are listed as first to fifth items 40a to 40e. In this example, the second item 40b relates to 'football', and it is illustrated as part of the item that a live match between Brazil and Germany currently forms the basis of an IPDC service being transmitted by the DVB transmitter 13. When the second item 40b is selected by a user, the mobile terminal 10 begins to receive the service, as illustrated in FIG. 5.

Items in the service menus relating to IPDC services are shown in the same way as other items, or in a very similar way. In the example shown, the fact that the second item 40b relates to an IPDC service is illustrated by some smaller text to the right side of the larger text which gives the name of the item in the service menu.

A number of steps are carried out in the background between the selection of the second item 40b of FIG. 4 and the consumption of the IPDC service relating thereto, as will now be described with reference to FIG. 6.

Figure 6:
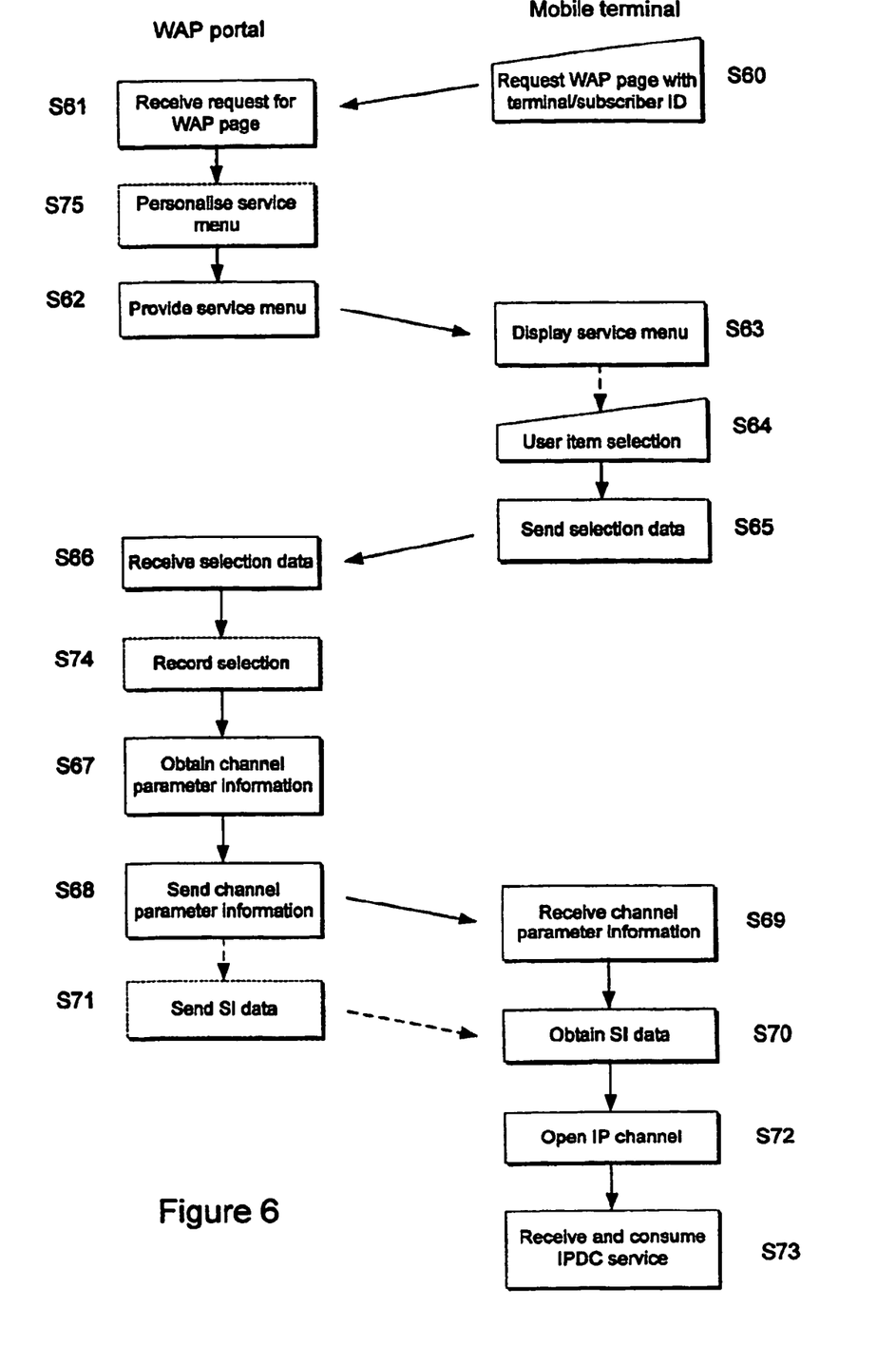
FIG. 6 is a flow diagram illustrating operation of the mobile terminal and a WAP portal forming part of the FIG. 1 system in one embodiment of the invention.

FIG. 6 is a schematic flow diagram illustrating certain operations of the mobile terminal 10 and the WAP portal 16.

The process begins at step S60, with the mobile terminal 10 requesting a WAP page which relates to the WAP portal 16 of the mobile network operator. The request transmitted at step S60 includes an identification of the mobile terminal and/or the user/subscriber of the terminal. This identification may comprise the International Mobile Subscriber Identity (IMSI), data indicating the make and model, and possibly also the software release number of the mobile terminal 10, the IPDC terminal identifier, or any other suitable identification and/or characterisation. The exact form of the data is not necessary, so is not described in detail here. This request is received at the WAP portal 16 at step S61. Following this step, the service menu is provided at step S62. This involves the transmission from the base station 14 of pushed data allowing the service menu illustrated in FIG. 2 to be presented on the display 11 of the mobile terminal 10. The service menu is then displayed at the mobile terminal at step S63. The user then may navigate through the service menu and service menus falling below it in the hierarchy by way of user input S64. When the user selects an item forming part of a service menu which relates to an IPDC service, instead of another service menu or a non-IPDC service, data indicating the selection is transmitted from the mobile terminal at S65. The item selection data is received at the WAP portal 16 at step S66. In response, the WAP portal 16 obtains the channel parameter information relating to the service which corresponds to the selected item at step S67. In the first embodiment, this channel parameter information is the name of the service, the IP address and the port number, which is sent at step S68 and received at step S69 at the mobile terminal 10. At step S70, the mobile terminal obtains SI data relating to the selected service. In the first embodiment, the SI data is transmitted from the WAP portal 16 at step S71. This SI data includes the INT, the NIT and the PMT SI data mentioned above. In the second embodiment, the step S70 involves obtaining SI data by listening to broadcasts from the DVB transmitter 13. It will be appreciated that it will in most cases be impractical to wait until the channel parameter information is received at step S69 before obtaining the SI data. Instead, the mobile terminal 10 is arranged to monitor periodically transmissions from the DVB transmitter 13 and to maintain in a memory (not shown) up-to-date ESG and SI data. In this case, the obtaining SI data step S70 involves reading the stored SI data from the memory (not shown) included in the mobile terminal 10.

In both the first and second embodiments, the mobile terminal, having received the channel parameter information and obtained the SI data at steps S69 and S70, opens an IP channel using the received information at step S72. The mobile terminal can then receive and consume the IPDC service at step S73.

The opening of the IP channel step S72 will be appreciated to include opening the required IP port, and optionally filters forming part of the mobile terminal 10.

The step S68 may also comprise sending data identifying an application which is needed to consume the selected IPDC service. In this case, the mobile terminal 10 is responsive to the data to open, i.e. run the software comprising, the application. Alternatively, the mobile terminal 10 could determine from the received service data what application is needed.

Optionally, the WAP portal 16 includes an additional step S74, in which the selection of the IPDC service by the mobile terminal 10 is recorded. This step S74 is interposed between the step of receiving the selection at S66 and the step S67 of obtaining the channel parameter information. The recording of the information at step S74 allows the gathering of information identifying the number of mobile terminals which request the different IPDC services available through the WAP portal 16. This information can be of use to the mobile network operator, since it can allow it to tailor the IPDC services provided through its WAP portal 16 to make more prominent popular services and to make less prominent, or even omit entirely, services which are not popular or which are not used. If the mobile terminal 10 accesses a service directly from the DVB transmitter 13 without involving the WAP portal 16, the mobile network operator is unable to obtain information about service usage without the user of the mobile terminal voluntarily providing the information.

Preferably, the step of recording user selections at S74 is performed anonymously, i.e. the WAP portal 16 does not record information identifying the mobile terminal 10 or the subscriber using the mobile terminal when noting what IPDC services have been accessed through the WAP portal.

An advantage of the first embodiment described above is that the mobile terminal 10 does not need to listen to broadcasts from the DVB transmitter 13 before receiving a service, as would normally be the case. Instead, all of the information needed to access the required service is available through the WAP portal 16. This can reduce the time required to access the service, and may also provide reduced battery power consumption.

An additional optional step is carried out in the WAP portal 16, namely the step of personalising the service menu. This is illustrated at step S75. Step S75 involves analysing the terminal/subscriber identification and characterisation information transmitted from the mobile terminal at step S60. Only IPDC services which are suitable for the mobile terminal are included in the service menu at step S62. A service is not suitable if, for example, the mobile terminal 10 does not have the capability of consuming the service. This may be, for example, because it is not provided with the software application which is needed to consume the data, or perhaps because it is not provided with appropriate output transducers. For example, the display 11 of the mobile terminal 10 may not have a suitable resolution for consumption of certain services, or it may be that the mobile terminal does not have appropriate audio output facilities, for example stereophonic audio reproduction capability. The information that the WAP portal 16 needs to determine whether or not the mobile terminal 10 is capable of consuming the data relating to a service forms part of the ESG data and the SI data provided by the ESG data module 18 and the SI data module 19 respectively.

The personalising step S75 may also include determining from data identifying the subscriber IPDC services which the subscriber is not authorised to access. This may occur if, for example, a subscriber is roaming in a foreign network.

Personalisation occurs on each generation of a service menu for the mobile terminal 10. In particular, the main page shown in a display screen of a mobile terminal has a service menu personalised to take account of the particulars of the mobile terminal 10 or the subscriber using the mobile terminal, and service menus generated at positions further down the hierarchy from the main page also are personalised to take account of this.

Instead of not including inappropriate items on a service menu, they may be included but distinguished from the other items, for example by being displayed in a different colour. A user would then know that the corresponding services are not fully accessible using the mobile terminal 10. Each such item preferably is provided by the WAP portal 16 such that selecting it results in redirection to a WAP page (or other information provision service) giving instructions on how to access the corresponding service. This information may be instructions to download an appropriate software application, to buy a suitable terminal, or perhaps may include directions for accessing the service in a different way, for example using the world wide web or a television receiver.

In a further embodiment, again described with reference to FIG. 6, the personalisation of service menus is not performed prior to the provision of service menu step S62. Instead, if the WAP portal 16 receives at step S66 data selecting an IPDC service which is unsuitable for the mobile terminal (either because the mobile terminal 10 does not have the capability to consume the service or because it is not authorised to receive the service), the user is redirected to a personalised service menu page. Here, data is pushed to the mobile terminal 10 to provide a service menu which lists only services that the mobile terminal is capable of consuming and/or is authorised to receive. The WAP portal 16 provides on this service menu only services which are similar to the IPDC service selected at step S65. The personalised service menu provided following redirection may also include text indicating that redirection has been effected, in order to inform the user.

Figure 7:
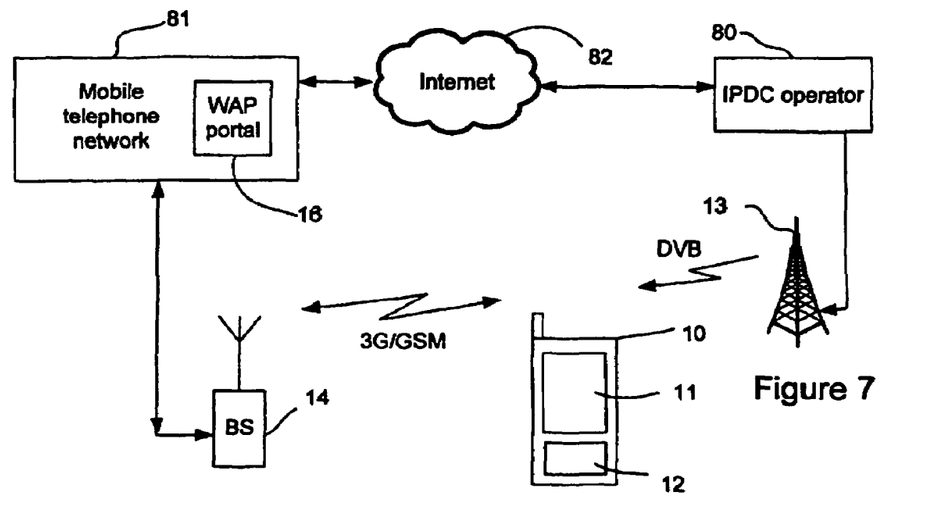
FIGS. 7 and 8 are schematic drawings of alternative system configurations.

A further embodiment will now be described with reference to FIG. 7. In FIG. 7, the mobile terminal 10 is operable to receive signals broadcast by a DVB transmitter 13, as in FIG. 1. However, an IPDC operator 80 is separated from a mobile network 81. The IPDC operator 80 and the operator of the mobile network 81 may or may not be the same entity, and may or may not be present at different locations. In the embodiment of FIG. 7, the data provided by the ESG data module 18, the SI data module 19 and the operator related data module 20 are provided to the mobile telephone network 81 via the Internet 82 by the IPDC operator. Alternatively, the Internet 82 could be replaced by any other suitable communications channel. The mobile network 81 preferably is arranged to request up-to-date information from the IPDC operator 80 as and when required, for example a predetermined time before data stored in the mobile network is due to expire. However, any other suitable scheme could be used instead.

In this example, the WAP portal 16 is shown as forming part of the mobile telephone network 81, which will typically be the case when the user of the mobile terminal 10 wishes to access the service menu of his or her mobile telephone network operator. The WAP portal 16 may be located at any convenient location within the mobile network 81. In this example, the ESG data module 18, the SI data module 19 and the operator related data module 20 form part of the IPDC operator 80, although not shown in FIG. 7.

Figure 8:
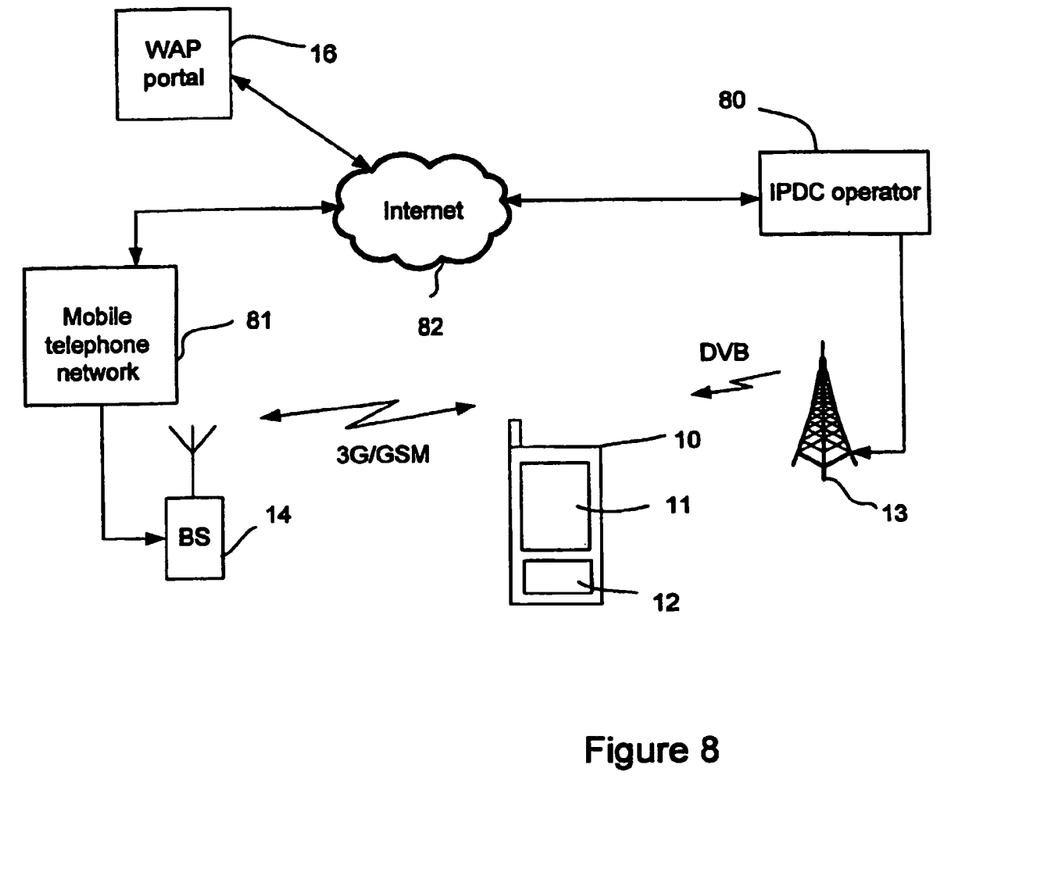

A further example will now be described with reference to FIG. 8. Here, the WAP portal 16 does not form part of the mobile telephone network. Instead, it is connected to the IPDC operator 80 and the mobile network 81 by the Internet 82. Alternatively, a different communication channel could be utilised, or a separate communication channel utilised for each of the separate connections. The WAP portal 16 is provided with ESG data, SI data and operator related data from the IPDC operator 80 in any suitable manner. The main difference here is that when the mobile terminal 10 requires data from the WAP portal 16, the request for data is routed through the mobile network 81 and the Internet 82 to the WAP portal 16. Similarly, data pushed from the WAP portal 16 to the mobile terminal 10 passes through the Internet 82 and the mobile network 81.

Allowing access to IPDC services through the WAP portal 16, with or without providing SI data, has the advantage that it allows users to access IPDC services through a familiar user interface. Suitable construction of the service menus in the WAP portal 16 can allow all of the appropriate IDPC services to be provided to the user of the mobile terminal 10 through the WAP portal 16, thereby allowing the user to avoid DVB ESG usage if required.

The above-described embodiments are illustrative only, and are not intended to be limiting on the scope of protection afforded. Any feature specified as being preferable or optional is not essential, but instead may be omitted entirely or replaced by another feature. Anything which is said 'may' be included or 'may' have some characteristic also is preferable, and could be omitted or instead replaced with another feature or characteristic. The scope of protection is to be limited only by the accompanying claims and their equivalents.

The invention claimed is:

1. A method of operating a mobile terminal, the method comprising:
   accessing a service portal via a bi-directional network to receive a service menu;
   selecting an item on a the service menu and corresponding to a broadcast service;
   receiving channel parameter data relating to the corresponding broadcast service from the service portal via the bi-directional network;
   receiving service information data relating to the corresponding broadcast service;
   using the received channel parameter data and the service information data to open a broadcast communications channel via a broadcast network separate from the bi-directional network; and
   receiving broadcast data for the broadcast service through the broadcast communications channel.

2. A method as claimed in claim 1, in which the channel parameter data includes an Internet protocol address and/or a port number relating to the broadcast service.

3. A method as claimed in claim 1, in which the service information data comprises one or more of an IP/MAC notification table, a network information table, and a program mapping table.

4. A method as claimed in claim 1, comprising receiving the service information data from the service portal via the bi-directional network.

5. A method as claimed in claim 1, comprising receiving the service information data over the broadcast network.

6. A method as claimed in claim 1, comprising receiving data from the service portal identifying an application, and, in response, opening the application in the mobile terminal.

7. A method as claimed in claim 1, in which the service portal is a wireless application protocol service.

8. A method as claimed in claim 1, further comprising sending data identifying a subscriber, the mobile terminal and/or terminal capabilities to the service portal.

9. A method as claimed in claim 1, comprising reading the service information data from a memory included in the terminal.

10. A mobile terminal comprising:
    means for accessing a service portal via a bi-directional network to receive a service menu;
    means for allowing selection of an item on the service menu and corresponding to a broadcast service;
    means for receiving from the service portal channel parameter data relating to the broadcast service via the bi-directional network;
    means for receiving service information data relating to the corresponding broadcast service;
    means for opening a broadcast communications channel via a broadcasting network separate from the bi-directional network by using the channel parameter data and the service information data; and means for receiving broadcast data for the broadcast service through the broadcast communications channel.

11. A mobile terminal as claimed in claim 10, in which the channel parameter data includes an Internet protocol address and/or a port number relating to the broadcast service.

12. A mobile terminal as claimed in claim 10, in which the service information data comprises one or more of an IP/MAC notification table, a network information table, and a program mapping table.

13. A mobile terminal as claimed in claim 10, comprising means responsive to data received from the service portal identifying an application for opening the application in the terminal.

14. A mobile terminal as claimed in claim 10, comprising means for reading the service information data from a memory included in the terminal.

15. A mobile terminal as claimed in claim 10, arranged to receive the service information data from the service portal.

16. A mobile terminal as claimed in claim 10, arranged to receive the service information data over a broadcast network.

17. A mobile terminal as claimed in claim 10, in which the service portal is a wireless application protocol service.

18. A mobile terminal as claimed in claim 10, further comprising means for sending data identifying a subscriber, the terminal and/or terminal capabilities to the service portal.

19. A method of operating a server, the method comprising:
storing data relating to channel parameters of one or more broadcast services;
receiving a request from a user terminal for accessing a service portal stored in the server over a bi-directional network:
providing over the bi-directional network one or more selectable items on a service menu included in the service portal, each item relating to a broadcast service; and
in response to the selection of an item from the user terminal, sending channel parameter data relating to the corresponding broadcast service to the user terminal, wherein the channel parameter data includes one or more instructions to access a broadcast communications channel via a broadcast network separate from the bi-directional network.

20. A method as claimed in claim 19, further comprising recording the number of occasions of each item being selected.

21. A method as claimed in claim 19, comprising:
determining which services the terminal is capable of consuming and/or is permitted to access, and
providing on the service menu only items relating to appropriate services.

22. A method as claimed in claim 19, comprising:
determining whether the terminal is capable of consuming and/or is permitted to access the broadcast service relating to the selected item, and in response to a negative determination, providing a service menu listing one or more appropriate services.

23. A method as claimed in claim 19, comprising transmitting data identifying an application suitable for consuming the broadcast service.

24. A method as claimed in claim 20, comprising:
determining whether the terminal is capable of consuming and/or is permitted to access the broadcast service relating to the selected item, and in response to a negative determination, providing a service menu listing one or more appropriate services.

25. An apparatus comprising:
an operator system including at least one transceiver and software, wherein the operator system is configured to:
store data relating to channel parameters of one or more broadcast services; to receive a request from a user terminal for accessing a service portal stored in the apparatus over a bi-directional network;
provide over the bi-directional network one or more selectable items on a service menu included in the service portal, each of said one or more selectable items on said service menu relating to a broadcast service; and
be responsive to the selection of an item by the user terminal to send channel parameter data relating to the corresponding broadcast service to the user terminal, wherein the apparatus is a service portal and wherein the channel parameter data includes one or more instructions to access a broadcast communications channel via a broadcast network separate from the bi-directional network.

26. An apparatus as claimed in claim 25, wherein the operator system is further configured to record the number of occasions of each item being selected.

27. An apparatus as claimed in claim 25, wherein the operator system is further configured to determine services the terminal is capable of consuming and/or is permitted to access, and to provide on the service menu only items relating to appropriate services.

28. An apparatus as claimed in claim 25, wherein the operator system is further configured to determine whether the terminal is capable of consuming and/or is permitted to access the broadcast service relating to a selected item, and responsive to a negative determination to provide a service menu listing one or more appropriate services.

29. An apparatus as claimed in claim 25, wherein the operator system is further configured to transmit data identifying an application suitable for consuming the broadcast service.

30. A system comprising a service portal accessible via a bi-directional network by a mobile terminal,
the service portal being arranged to provide over the bi-directional network a service menu comprising one or more items each corresponding to a broadcast service;
the mobile terminal being arranged for allowing selection of one of the items over the bi-directional network;
the service portal being responsive to an item selection to send to the mobile terminal channel parameter information via the bi-directional network, the channel parameter information relating to the corresponding broadcast service;
the mobile terminal being arranged for receiving service information data relating to the corresponding broadcast service;
the mobile terminal being arranged to use the channel parameter information and the service information to open a broadcast communications channel via a broadcast network separate from the bi-directional network, and to receive broadcast data for the broadcast service through the broadcast communications channel.

31. A method of operating a system comprising a service portal and a mobile terminal, the method comprising:
accessing the service portal from the mobile terminal via a bi-directional network; providing a service menu comprising one or more items each corresponding to a broadcast service;
using the mobile terminal to select one of the items;
sending channel parameter information from the service portal to the mobile terminal over the bi-directional network, the channel parameter information relating to the broadcast service;

at the mobile terminal, using the received channel parameter information to open a broadcast communications channel via a broadcast network separate from the bi-directional network; and at the mobile terminal, receiving broadcast data for the broadcast service through the broadcast communications channel.

32. An apparatus comprising:

a mobile terminal including at least one transceiver and software, wherein the mobile terminal is configured to:

access a service portal via a bi-directional network;

allow selection of an item on a service menu included in the service portal and corresponding to a broadcast service;

receive from the service portal channel parameter data relating to the broadcast service the channel parameter data being received via the bi-directional network; to receive service information data relating to the broadcast service;

open a broadcast communications channel via a broadcast network separate from the bi-directional network by using the channel parameter data and the service information; and receive broadcast data for the broadcast service through the broadcast communications channel, wherein the apparatus is a mobile terminal.

33. An apparatus as claimed in claim 32, in which the channel parameter data includes an Internet protocol address and/or a port number relating to the broadcast service.

34. An apparatus as claimed in claim 32, in which the service information data comprises one or more of an IP/MAC notification table, a network information table, and a program mapping table.

35. An apparatus as claimed in claim 32, wherein the mobile terminal is further configured to receive the service information data from the service portal.

36. An apparatus as claimed in claim 32, wherein the mobile terminal is further configured to receive the service information data over a broadcast network.

37. An apparatus as claimed in claim 32, wherein the mobile terminal is further configured to be responsive to data received from the service portal identifying an application to open the application in the terminal.

38. An apparatus as claimed in claim 32, in which the service portal is a wireless application protocol service.

39. An apparatus as claimed in claim 32, wherein the mobile terminal is further configured to send data identifying a subscriber, the terminal and/or terminal capabilities to the service portal.

40. Apparatus as claimed in claim 32, wherein the mobile terminal is further configured to read the service information data from a memory in the mobile terminal.

* * * * *